March 6, 1956     L. VELLA     2,736,966
AUTOMATIC CALIBRATING MACHINE FOR CYLINDRICAL ROLLERS
Filed Nov. 14, 1951
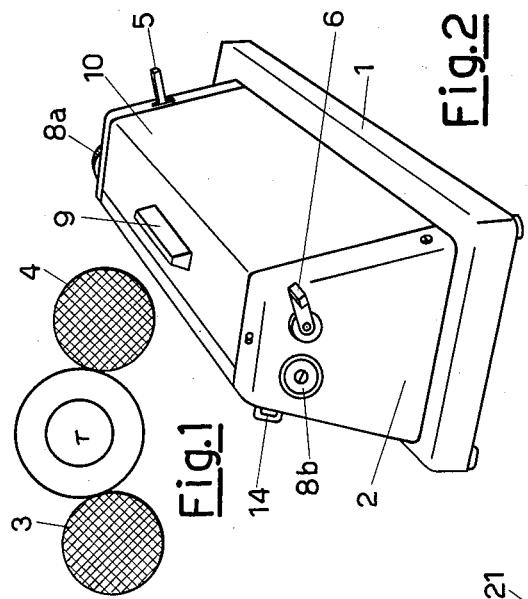
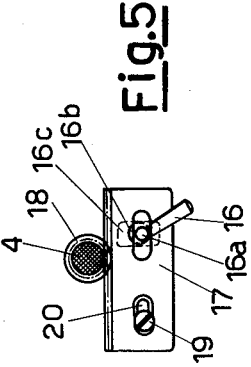
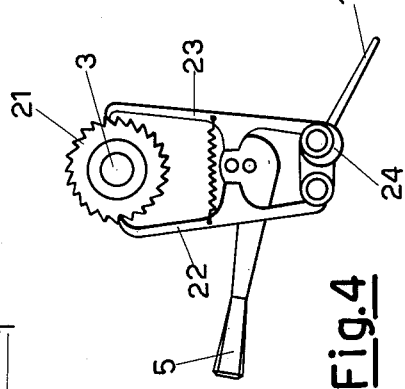
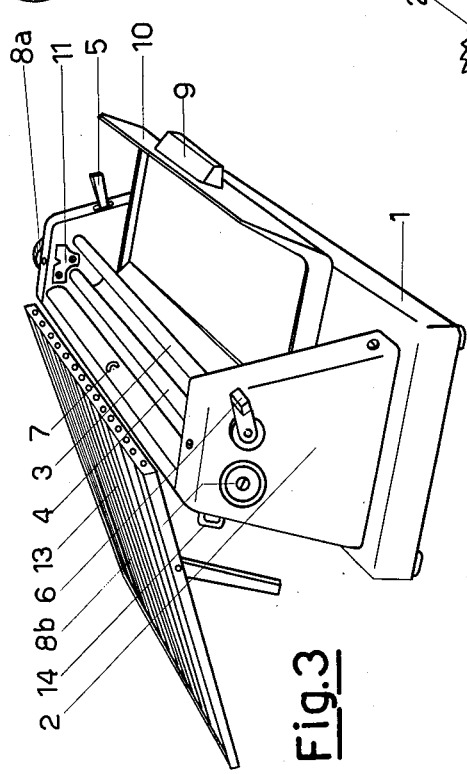
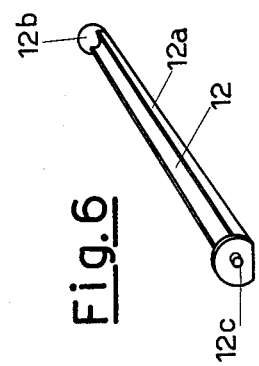
INVENTOR.
LUIGI VELLA
BY
ATTORNEY United States Patent Office 2,736,966
Patented Mar. 6, 1956

1

2,736,966

AUTOMATIC CALIBRATING MACHINE FOR CYLINDRICAL ROLLERS

Luigi Vella, Cogozzo V. T., Italy

Application November 14, 1951, Serial No. 256,339

Claims priority, application Italy November 16, 1950

6 Claims. (Cl. 33—147)

The present invention relates to gauging and assorting devices for cylindrical pieces, and is particularly directed to a device which is adapted to gauge and assort the pressure bushings of spinning machines.

The problem of gauging the diameters of bushings and assorting such bushings according to size is encountered in all spinning mills and at the factories where the bushings are produced.

Heretofore, it has been the common practice to gauge the diameters of pressure bushings for spinning machines by individually checking each bushing with a limit snap gauge or, at best, by employing a guillotine gauge which simultaneously checks the diameters of a limited number of bushings. In either case, the actual diameter of each pressure bushing is estimated by the operator on the basis of the difficulty or ease with which the bushing may enter into or be removed from the gauge. Thus, the gauging is by a subjective test, and the accuracy of the assorting depends, to a large extent, upon the skill of the operator. Moreover, the above mentioned procedures for gauging the diameters of the bushings require that each bushing be tested a number of times to ensure an accurate comparison with other bushings, and the length of time required for such repeated testing practically restricts the gauging and assorting to newly manufactured bushings and prevents the checking, from time to time, of the bushings at the spinning mill.

Accordingly, it is an object of the present invention to provide a device for simultaneously and rapidly gauging the diameters of cylindrical parts, for example, pressure bushings or rollers for spinning machines, and without the possibility of error resulting from the derelictions of an unskilled operator.

Another object is to provide a gauging device for cylindrical parts, for example, pressure bushings for spinning machines, wherein the operator is not called upon to bring the parts being tested into actual contact with the gauging members so that no error can result from variations in the force with which the parts being tested are engaged with the gauging members.

In accordance with the present invention, a gauging device comprises a first cylindrical roller and a second cylindrical roller supported with their axes in parallel relationship and lying in the same horizontal plane. The first cylindrical roller is horizontally adjustable to initially establish the distance across the space between the rollers, and the second cylindrical roller is mounted for rotation about an axis which is eccentrically related to the axis of its cylindrical surface so that, as the second roller is angularly displaced in a step-by-step manner, the space between the two rollers will vary and the changes in the dimension across the space between the rollers will have a definite and calibrated relation to the rotated position of the second roller. Thus, the first roller is initially adjusted so that the space between the rollers is slightly less than the diameter of the smallest bushing of the type being gauged and assorted, while the second roller is initially positioned so that its generating axis is in the hori-

2 zontal plane passing through its axis of rotation and at the side of the latter closest to the first roller. A group of cylindrical parts or bushings to be tested may then be placed end-to-end between the rollers and supported by the latter. As the operator effects the step-by-step rotation of the second roller to gradually and incrementally increase the dimension across the space between the rollers, the cylindrical parts will automatically drop through the space, and the diameter of each part will be known to lie between the limits defined by the distance across the space when the particular part drops and the distance across the space prior to the rotational movement effecting the dropping of the part. Thus, the several cylindrical parts can be classified or assorted according to their diameters.

In order to ensure that the present invention may be fully understood, an illustrative embodiment is hereinafter described in detail and shown in the accompanying drawing, wherein:

Fig. 1 is a diagrammatic view illustrating the operating principle of a device embodying the present invention;

Fig. 2 is a perspective view of a device embodying the present invention and shown in its closed or inoperative condition;

Fig. 3 is a perspective view of the device of Fig. 2, but shown in condition for operation;

Fig. 4 is a detail elevational view of an adjusting mechanism included in the device of Figs. 2 and 3;

Fig. 5 is a detail elevational view of another adjusting mechanism included in the device of Figs. 2 and 3; and Fig. 6 is a perspective view of a loading element for use in connection with the device of Figs. 2 and 3.

Referring to the drawing in detail, it will be seen that the device embodying the present invention includes a base or frame 1 having standards 2 extending upwardly adjacent the opposite ends thereof. Cylindrical rollers 3 and 4 having ground surfaces extend between the upper portions of the standards 2 with the axes of the rollers 3 and 4 arranged parallel to each other and lying substantially in the same horizontal plane. The roller 3 is supported at its opposite ends for rotation about an axis which is eccentric, or displaced radially, relative to the generatrix of its cylindrical surface. The roller 4 is mounted for initial adjustment toward and away from the roller 3, and for this purpose each of the opposite end portions of the roller 4 is preferably provided with a spur gear 18 (Fig. 5) which rides on the toothed upper edge of a gear rack member 17 carried by the adjacent standard 2. The opposite ends of the roller 4 extend through the standards 2, and a knob 8a is fixed to the roller 4 at the outside of one standard 2 to permit manual rotation of roller 4 which is translated into linear movement thereof by the meshing gears 18 and gear rack members 17. Another knob 8b is threaded on the roller 4 at the outside of the other standard 2 to bear against the latter and lock the roller 4 in its adjusted position. It is to be understood that the standards 2 are provided with horizontally elongated slots (not shown) through which the portions of the roller 4 carrying the knobs 8a and 8b extend.

Further, as shown in Fig. 5, one of the gear rack members 17 is preferably mounted adjustably on the related standard so that it may be displaced independently of the other rack member for adjusting the parallelism of the rollers 3 and 4. Such mounting for one of the rack members 17 may include a bolt 19 carried by the related standard 2 and engaging in a horizontally elongated slot 20 formed in the rack member (Fig. 5). A handle 16 extends from an axle 16a rotatably mounted on the rack member 17 and formed with an eccentric portion 16b engaging in a vertically enlarged slot 16c formed in the related standard. Thus, when the bolt 19 is loosened, the handle 16 may be angularly displaced to shift the related rack member 17, and the adjacent end of the roller 4, either toward or away from the roller 3.

The roller 3 is rotated in a step-by-step manner through manual actuation of a ratchet system shown in Fig. 4. This ratchet system includes a ratchet gear 21 fixed on an end portion of the roller 3 within the adjacent standard 2 and engageable by pawls 22 and 23 which are driven by a rockable handle 5 projecting from the standard 2. An eccentric 24 is provided at the pivotal connection of the release pawl 23 and is adjustable by a handle 15 for varying the angular displacement of the roller 3 for each rocking cycle of the operating handle 5. A crank 6 is fixed to the end of the roller 3 remote from the ratchet system for returning the roller 3 to its initial position.

An indicator assembly 7 of conventional construction is suitably connected to the rollers 3 and 4 to indicate the distance across the space between the rollers 3 and 4, and a knob 14 projecting from one of the standards 2 (Fig. 3) is provided for initial calibration of the indicator assembly. Since the roller 3 is eccentrically mounted, the rotation of the roller 3 in a step-by-step fashion effects corresponding changes in the distance across the space between the rollers 3 and 4 and these changes can be calibrated so that, each time the ratchet operating handle 5 is rocked, a predetermined change takes place in the distance across the space between the rollers and this change is reflected by the indicator 7.

A loading member 12 (Fig. 6) is provided for placing the cylindrical parts to be gauged and assorted upon the rollers 3 and 4. The loading member 12 includes a semi-cylindrical body 12a having circular end plates 12b at the opposite ends thereof, and each end plate has a trunnion 12c extending therefrom. A support bracket 11 (Fig. 3) is mounted on the inside face of each standard 2 above the rollers 3 and 4 and is formed with an upwardly opening notch or recess to receive the trunnion 12c at the related end of the loading member. Since the body 12a of the loading member is semi-cylindrical, it is apparent that the center of gravity of the loading member does not lie on the axis of the trunnions 12c and the loading member will normally assume the position shown in Fig. 6. The cylindrical parts are laid end-to-end in the body 12a of the loading member, and the latter is rotatably supported on the brackets 11 above the space between the rollers 3 and 4. When the operator rotates the loading member 12 to an inverted position, the cylindrical parts to be gauged and assorted will drop out of the loading member and rest upon the rollers 3 and 4 so long as the distance across the space between the latter is smaller than the diameters of the cylindrical parts.

The illustrated gauging and assorting device includes a pivoted cover 10 which, in its closed position (Fig. 2), serves to protect the rollers 3 and 4 and, in its open position, swings under the space between the rollers (Fig. 3) to form a hopper to catch the cylindrical parts which fall through the space between the rollers as the distance across that space is progressively increased. The cover 10 may be provided with a handle 9 to facilitate opening and closing of the cover.

Finally, a tray or receptacle 13 is provided for connection to the device in its open position (Fig. 3) and is formed with separated channels in which the operator may place the cylindrical parts of different diameters as the latter fall through the space between the rollers 3 and 4.

In operating the device described above, the distance across the space between the rollers 3 and 4 is initially adjusted. Such initial adjustment is achieved by setting the roller 3 at a predetermined angular position, and then releasing the knob 8b and rotating the knob 8a to move the roller 4 toward the roller 3. Then a cylindrical part of a known diameter as small as that of the smallest part to be gauged and assorted is placed on the rollers 3 and 4 and the roller 4 is displaced away from the roller 3 until the known or calibrating part falls through between the rollers 3 and 4. The roller 4 is then locked in position by the knob 8b. The parts to be gauged and assorted are placed in the loading member 12 and the latter is inverted to deposit the parts on the rollers 3 and 4. As shown in Fig. 1, so long as the distance across the space between the rollers 3 and 4 is less than the diameter of a particular cylindrical part, for example, the illustrated pressure bushing T, that part will be supported by the rollers. The handle 5 is then rocked to actuate the ratchet system which produces step-by-step angular displacement of the eccentrically mounted roller 3, and the indicator 7 records the increases in the distance across the space between the rollers. When the distance across the space between the rollers 3 and 4 is increased sufficiently, the smallest of the cylindrical parts falls through and may be retrieved from the hopper-forming cover to be placed by the operator in the channel of tray 13 corresponding to the diameter of the part as shown by the indicator 7. As the step-by-step rotation of roller 3 is continued, cylindrical parts of progressively larger diameter will fall through the space between the rollers, and the condition of the rollers at the time when each part falls through will establish the diameters of the several parts.

From the foregoing, it is apparent that the operator does not actually touch the parts being gauged during the actual gauging operation and merely manipulates the controls so that little or no skill is required to achieve rapid and accurate gauging and assorting. Further, since the cylindrical parts automatically fall through the space between the rollers 3 and 4 when the distance across that space exceeds the diameter of the part being tested, the described device not only establishes the diameter of the part which falls through the space but also serves to separate that part from the parts of greater diameter which continue to be supported on the rollers 3 and 4.

While I have described an illustrative embodiment of the invention, it is to be understood that arrangements, other than those illustrated, may be provided for adjusting the distance between the rollers 3 and 4, and that other changes and modifications may be effected in the described embodiment without departing from the scope and spirit of the invention as defined in the appended claims.

What I claim is:

1. A device for gauging and assorting cylindrical bodies comprising two cylindrical rollers having circular cross-sections and disposed in parallel, spaced apart relationship and with the axes of said rollers lying in substantially the same horizontal plane, means supporting at least one of said rollers for rotation about an axis which is eccentric with respect to the centers of the circular cross-sections of said one roller, means for incrementally rotating said one roller to vary the distance across the space between said rollers during gauging and assorting of cylindrical bodies so that cylindrical bodies placed on said rollers will fall through said space between the rollers when said distance across the space exceeds the diameters of the cylindrical bodies, and means below said space between the rollers to catch the cylindrical bodies which fall through said space.

2. A device for gauging and assorting cylindrical bodies comprising two cylindrical rollers having circular cross-sections and disposed in parallel, spaced apart relationship and with the axes of said rollers lying in substantially the same horizontal plane, means supporting at least one of said rollers for rotation about an axis which is eccentric with respect to the centers of the circular cross-sections of said one roller, a rockable handle lever, ratchet transmission means driven by said handle lever and incrementally driving said one roller to vary the distance across the space between said rollers during gauging and assorting of cylindrical bodies so that cylindrical bodies placed on said rollers will fall through said space between the rollers when said distance across the space exceeds the diameters of the cylindrical bodies, and means below said space between the rollers to catch the cylindrical bodies which fall through said space.

3. A device for gauging and assorting cylindrical bodies comprising two cylindrical rollers having circular cross-sections and disposed in parallel, spaced apart relationship and with the axes of said rollers lying in substantially the same horizontal plane, means supporting at least one of said rollers for rotation about an axis which is eccentric with respect to the centers of the circular cross-sections of said one roller, means for incrementally rotating said one roller to vary the distance across the space between said rollers during gauging and assorting of cylindrical bodies so that cylindrical bodies placed on said rollers will fall through said space between the rollers when said distance across the space exceeds the diameters of the cylindrical bodies, means below said space between the rollers to catch the cylindrical bodies which fall through said space, and means for initially adjusting the other of said rollers horizontally toward and away from said one roller including a spur gear on each of the opposite ends of said other roller, a horizontal gear rack supporting each of said spur gears and knob means fixed on said other roller for manual rotation to effect rolling of said spur gears on the associated gear racks.

4. A device according to claim 3; further including means for securing said other roller in its adjusted positions.

5. A device according to claim 3; including means for effecting adjustment of one of said gear racks in the horizontal direction to maintain the parallelism of said rollers.

6. A device for gauging and assorting cylindrical bodies comprising two cylindrical rollers having circular cross-sections and disposed in parallel, spaced apart relationship and with the axes of said rollers lying in substantially the same horizontal plane, means supporting at least one of said rollers for rotation about an axis which is eccentric with respect to the centers of the circular cross-sections of said one roller, means for incrementally rotating said one roller to vary the distance across the space between said rollers during gauging and assorting of cylindrical bodies so that cylindrical bodies placed on said rollers will fall through said space between the rollers when said distance across the space exceeds the diameters of the cylindrical bodies, means below said space between the rollers to catch the cylindrical bodies which fall through said space, and means for depositing cylindrical bodies on top of the rollers including a semi-cylindrical member adapted to receive cylindrical bodies in end-to-end arrangement and means rotatably supporting said semi-cylindrical member above said space between the rollers so that, when said semi-cylindrical member is inverted, the cylindrical bodies will drop therefrom onto the rollers.

References Cited in the file of this patent

UNITED STATES PATENTS

| | | |
|---|---|---|
| 482,636 | Hillman | Sept. 13, 1892 |
| 1,109,866 | Nunamaker | Sept. 8, 1914 |
| 1,495,494 | Lutz | May 27, 1924 |
| 1,564,973 | Perry | Dec. 8, 1925 |
| 1,818,968 | Anderson | Aug. 18, 1931 |
| 2,531,317 | Baney et al. | Nov. 21, 1950 |
| 2,586,053 | Johnson | Feb. 19, 1952 |

FOREIGN PATENTS

| | | |
|---|---|---|
| 135,787 | Great Britain | Dec. 4, 1919 |